UNITED STATES PATENT OFFICE.

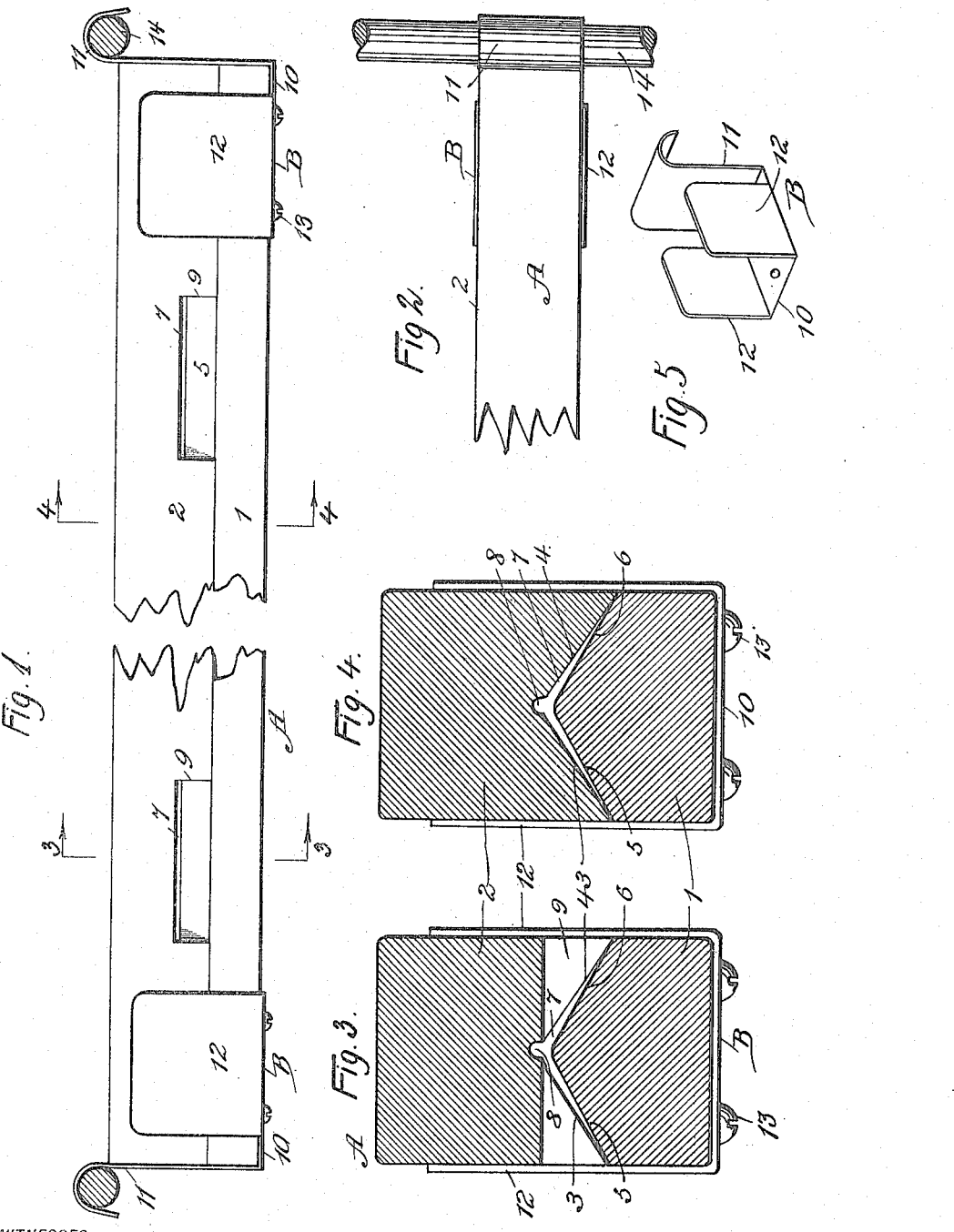

GEORGE WOODALL, OF DAVENPORT, IOWA.

COMBINED POULTRY-ROOST AND VERMIN-TRAP.

1,128,928.  Specification of Letters Patent.  Patented Feb. 16, 1915.

Application filed May 29, 1914. Serial No. 841,838.

*To all whom it may concern:*

Be it known that I, GEORGE WOODALL, a citizen of the United States, and a resident of Davenport, in the county of Scott and State of Iowa, have invented a new and Improved Combined Poultry-Roost and Vermin-Trap, of which the following is a full, clear, and exact description.

This invention relates to poultry roosts, and more particularly to that type in which the bars thereof embody traps for entrapping vermin that affect chickens and other poultry. It is well known that chicken lice and other vermin are in the habit of secreting themselves in small cracks in the roosts during the daytime when the chickens are not using the roosts.

The general objects of the present invention are to provide a simple, novel and effective lice entrapping means in connection with a roosting bar, whereby the lice can be enticed into the trap and readily caught and destroyed.

The invention has for its general objects to improve and simplify the construction of poultry roost bars and vermin traps of the character referred to so as to be reliable and efficient in use, and so designed that the bar can be readily taken apart for the cleaning of the lice trapping means.

A further object of the invention is the provision of a roost bar made in two sections fitting one on top of the other and having vermin-entrapping means between them, the lower section being provided at its ends with combined hangers and clips, whereby the bar as a whole can be hung on suitable perch supports and whereby the parts of the bar can be removably held together.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a side view of a combined roost bar and vermin trap with an intermediate portion broken away; Fig. 2 is a plan view of one end of the device; Figs. 3 and 4 are sectional views on the line 3—3 and 4—4, Fig. 1, respectively, and Fig. 5 is a perspective view of the combined clip and hanger.

Referring to the drawing, A designates the combined roost bar and vermin trap and B are the combined hangers and clips on the ends of the bar.

The part A is a bar-like structure split longitudinally into upper and lower sections 1 and 2 which are fitted together in such a manner that between them vermin entrapping means is provided. The lower or base piece 1 has its upper surface beveled from a longitudinal center line outwardly so as to be of inverted V-shape contour, and the under side of the upper or cap-piece 2 has an inverted V-shaped channel in which the sides 3 and 4 are disposed in an angle less obtuse than the angle between the beveled surfaces 5 and 6 of the base piece, and consequently a longitudinal chamber 7 is provided between the two sections of the bar A. The top of this chamber is formed with a small longitudinal groove 8 to form a harbor for the vermin. The upper section 2 rests on the lower section, and if the cracks between the sections do not afford a ready entrance for the vermin, openings 9 may be provided in the sides of the upper section 2 to communicate with the chamber 7, whereby the vermin can readily secrete themselves in the latter.

The combined hangers and clips B are made of sheet metal or any other suitable material and each comprises a base 10 from which rises at one end a hook 11, and from the sides of the base 10 are plates 12 which combine with the base to form a clip in which the sections of the bar A are mounted. The lower section 1 is fastened within the bottom of each clip by screws 13 or equivalent fastenings, and the side plates 12 extend upwardly beyond the bottom section 1 far enough to provide means in which the upper section of the bar A is seated, whereby said upper section is firmly retained on the lower section. The hooks 11 are adapted to be engaged over supporting rods or bars 14 which form the end supports for the roost bar. The section or cap-piece 2 of the roost bar is loose from the lower section and from the combined hangers and clips and can therefore be lifted off with facility when it is desired to destroy the vermin.

From the foregoing description taken in connection with the accompanying drawing, the advantages of the construction and method of operation will be readily understood by those skilled in the art to which the invention appertains, and while I have described the device which I now consider to be the best embodiment thereof, I desire to have it understood that the device shown is merely illustrative and that such changes may be made when desired as are within the scope of the appended claims. For instance, the bar sections 1 and 2 may be reversed if desired, the section 1 being on top of section 2, and in this case the combined hanger and bracket B would be fastened to the section 2, as will be obvious. Furthermore, the cross-sectional shapes of the bar sections may be varied, it being essential, however, that one nests into the other, to have a harbor between them for the vermin.

Having thus described my invention, I claim as new and desire to secure by Letters Patent:

1. A combined poultry roost bar and vermin trap comprising a bar divided longitudinally into upper and lower sections, the upper section having its under side channeled and the top of the under section being shaped to enter the channel and form therewith a chamber, and one of the sections having a plurality of transverse recesses in its inner surface for forming between the sections openings through which vermin can enter the chamber.

2. A combined poultry roost bar and vermin trap, comprising a bar divided longitudinally into two sections and having their inner or meeting faces shaped to form between the sections a chamber for harboring vermin, and hangers fastened to the bottom section and extending upwardly therefrom and engaging the ends of the upper section for preventing relative longitudinal movement of the sections.

3. A combined poultry roost bar and vermin trap comprising a bar divided longitudinally into upper and lower sections, and clips fastened to the ends of the lower section and in which the ends of the upper section are engaged.

4. A combined poultry roost bar and vermin trap comprising a bar divided longitudinally into upper and lower sections, and combined clips and hangers fastened to the ends of the lower section and into which the upper section removably engages.

5. A combined poultry roost bar and vermin trap comprising a bar divided longitudinally into two sections and having their inner or meeting faces shaped to form between the sections a chamber for harboring vermin, hangers fastened to the bottom section and extending upwardly therefrom and engaging the ends of the upper section for preventing relative longitudinal movement of the sections, and devices fastened to the bottom section and engaging the upper section to prevent lateral relative displacement of the sections.

In testimony whereof I have signed my name to this specification in the presence of two subscribing witnesses.

GEORGE WOODALL.

Witnesses:
  MAMIE IHMS,
  ALFRED SCHUMACHER.

Copies of this patent may be obtained for five cents each, by addressing the "Commissioner of Patents, Washington, D. C."